April 6, 1937.  G. H. CLAY  2,076,066

SERVICE BOX

Filed Aug. 3, 1936

Inventor
George H. Clay.
By Thorpe & Thorpe
Attorneys

Patented Apr. 6, 1937

2,076,066

UNITED STATES PATENT OFFICE 2,076,066

SERVICE BOX

George H. Clay, Kansas City, Mo.

Application August 3, 1936, Serial No. 94,041

5 Claims. (Cl. 137—13)

The invention relates to water service boxes and more especially to telescopic boxes adapted for use with service pipes located at different depths in the ground, and my object is to produce a simple, durable and efficient service box having a removable head or cap secured in place against accidental dislodgement, or against ready removal unless the operator has a proper key for that purpose.

A further object is to provide the upper telescopic member of the box, with an internal socket for receiving a brass nut and a cotter for preventing accidental dislodgement of the nut from the socket when the cap is not in place upon said member and held thereon by a clamping bolt engaging the said nut.

Another object of the invention is to provide a construction for fitting astride the water-pipe and protecting the valve and pipe against being broken should a truck or the like drive over the exposed end of the service box by permitting the assembly to move downwardly without imposing strain on the water line.

With these and other objects in view, the invention consists in certain novel and useful features of construction and organization of parts as hereinafter described and claimed; and in order that it may be fully understood, reference is to be had to the accompanying drawing, in which:—

Figure 1:
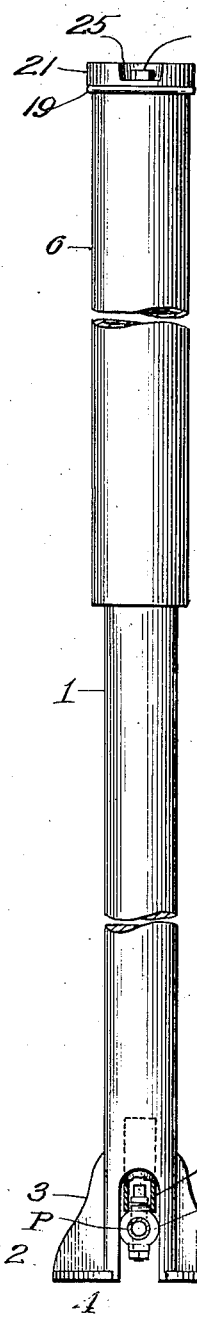
Figure 1 is a side elevation of a service box as disposed in operative relation to a water service pipe or main.
Figure 2:
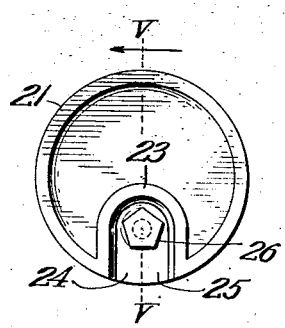
Figure 2 is an enlarged top plan view of the service box.
Figure 5:
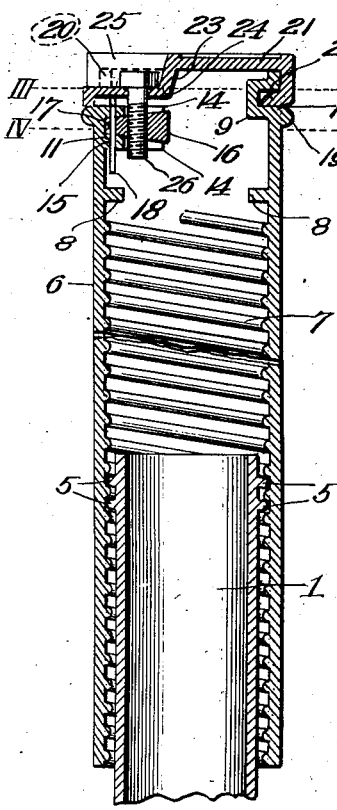
Figure 5 is a fragmentary central vertical section on the line V—V of Figure 2.
Figure 3:
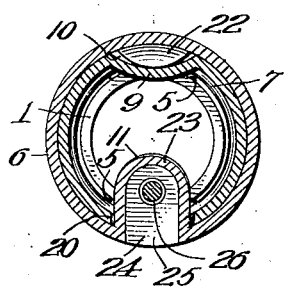
Figure 3 is a horizontal section on the line III—III of Figure 5.
Figure 4:
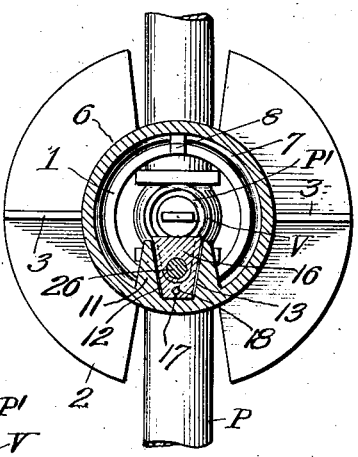
Figure 4 is a horizontal section on the line IV—IV of Figure 5.
Figure 6:
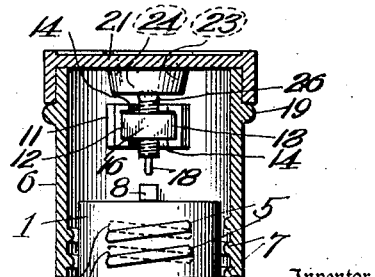
Figure 6 is a fragmentary vertical section taken at right angles to Figure 5, and showing the box with the upper member in its lowest position of adjustment.

Referring to the drawing, in detail, I indicates the inner or bottom member of the telescopic box, said member having a broad base 2 and bracing ribs or fins 3 for the base. The lower end of the member is bifurcated at 4 to fit over the service pipe P, and the latter has the usual valve V accessible through the box by a long valve-operating key, not shown. Within member I and secured upon the valve casing and enclosing the operating end thereof, is a short standpipe P', the upper end of which lies in a plane above the upper ends of the bifurcations 4, to guard the valve from loose earth entering member I through its lower end or through said bifurcations 4. The member I, near its upper end, is provided at opposite sides with related spiral threads 5 extending part-way around the member.

The outer or upper member 6 of the box has, for the greater part of its length, internal threads 7 for engagement with the threads 5 so that adjustment for varying the length or height of the box, must be effected by relative rotation of the members, and the member 6 has internal stop lugs 8 to limit the extent to which the members can be screwed together.

Near its upper end, the member 6 has an internal boss 9 provided with an external pocket 10, and diametrically opposite said boss and below the plane thereof, has an internal boss 11 formed with an outwardly tapering socket 12. The side walls of the boss are internally grooved or channeled at 13, and the top and bottom walls are bifurcated at 14, the boss also having a vertical hole 15.

A brass nut 16 of shape conforming to the tapered socket 12, has its threaded bore registering with the bifurcations of boss 11, and also has a hole 17 registering with the hole 15. A cotter pin 18 extends through said registering holes to secure the brass nut against accidental slippage within or dislodgement from said boss.

The member 6 has an external bead 19 at the bottom of the pocket 10 and its wall above the plane of the boss 11 is cut away to provide an opening 20 slightly wider than the said boss. A flanged cap 21 embraces and serves as a cover for the member 6, and has a depending hinge-hook 22 engaging the pocket 10. The flange of the cap engages the member 6 except for the space across the boss 11. Above said boss and opposite the hook, the cap flange is of contour in plan as at 23, and its lower end is connected by a bottom portion 24 to constitute part of the cover of the member 6 and incidentally provide a chamber or recess 25 for receiving the head of a bolt 26 which extends through said bottom portion 24, the bifurcations of boss 11, and the nut within said boss, the bolt thus serving to clamp the cap in place for excluding foreign material from the box. The bolt, by preference, has a pentagonal head to require operation by a key or other tool have a corresponding socket as distinguished from the more conventional socket type, such as a square or hexagonal.

A person with proper equipment can unscrew the bolt, and then remove the cap after first swinging it on the lug 22. He can then insert the valve-operating key or tool (not shown) into the box and turn the valve in the water pipe. The cap is then replaced and clamped in position by means of the bolt. The bifurcations 4 facilitate the positioning of member 1 relative to the water line and guard against injury thereof in the event said member is forced downward by the impact of a passing truck or the like, the stand-pipe always being set with its upper end above the top of the bifurcations to guard against the entry of dirt around the valve and its operating end.

From the above description it will be apparent that I have produced a construction embodying all of the features of advantage set forth as desirable and while I have described and illustrated what now appears to be the preferred embodiment of the invention, I reserve the right to all changes within the spirit of the invention and without the ambit of the prior art.

I claim:—

1. A service box including a tubular member having opposite internal bosses, one having an inwardly-opening socket and the other an externally-opening pocket, a nut within the socket, a closure cap fitting upon the member and provided with a depending flange externally-embracing the member and with a hinge hook engaging the external pocket, and a clamping bolt extending through the cap and socketed boss and engaged with the nut.

2. A service box including a tubular member having opposite internal bosses, one having an inwardly-opening socket and the other an externally-opening pocket, a nut within the socket, a closure cap fitting upon the member and provided with a depending flange externally-embracing the member and provided with a hinge hook engaging the external pocket, a clamping bolt extending through the cap and socketed boss and engaged with the nut, and means securing the nut within the socket against accidental dislodgement when not engaged by the bolt and with its bore positioned for engagement by the bolt when the latter is fitted through the cap to clamp the latter in place.

3. A service box including a tubular member having an internal boss provided with an inwardly-opening socket having registering openings through its top and bottom walls, a nut in the socket with its bore registering with the openings of said socket walls, a removable locking pin for holding the nut against accidental dislodgement from the socket, a cap closing the top of the said tubular member, and a clamping bolt extending through the cap and openings in the socket walls of the boss and engaged with the nut.

4. A service box including a tubular member having an internal boss provided with an inwardly-opening socket and an upright opening, a nut within the socket and provided with an opening registering with the boss opening, a pin extending through said registering openings to retain the nut in place, a cap closing the upper end of the member, and a bolt extending through the cap and engaging the nut to clamp the cap upon said member.

5. A service box including a tubular member having an internal boss provided with an inwardly-opening socket having an opening through its top wall, a nut in the socket with its bore registering with the opening in the socket wall, a removable headed locking pin projecting down through the top wall of the socket in position to engage the nut and prevent its accidental dislodgement, a cap closing the top of said tubular member and having a flange to space the cap from the head of the locking pin, and a clamping bolt extending through the cap and opening in the socket wall and engaged with said nut.

GEO. H. CLAY.